United States Patent
Sakabe

(10) Patent No.: US 9,964,644 B2
(45) Date of Patent: May 8, 2018

(54) LASER RADAR APPARATUS

(71) Applicant: DENSO WAVE INCORPORATED, Chita-gun, Aichi-pref. (JP)

(72) Inventor: Kouji Sakabe, Obu (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 234 days.

(21) Appl. No.: 15/023,559

(22) PCT Filed: Mar. 19, 2014

(86) PCT No.: PCT/JP2014/057619
§ 371 (c)(1),
(2) Date: Mar. 21, 2016

(87) PCT Pub. No.: WO2015/040876
PCT Pub. Date: Mar. 26, 2015

(65) Prior Publication Data
US 2016/0209510 A1 Jul. 21, 2016

(30) Foreign Application Priority Data

Sep. 19, 2013 (JP) .................................. 2013-194171

(51) Int. Cl.
*G01C 3/08* (2006.01)
*G01S 17/42* (2006.01)
*G01S 7/481* (2006.01)

(52) U.S. Cl.
CPC ............ *G01S 17/42* (2013.01); *G01S 7/4816* (2013.01); *G01S 7/4817* (2013.01)

(58) Field of Classification Search
CPC ....... G01S 17/42; G01S 7/4816; G01S 7/4817

USPC ........................................................ 356/4.01
See application file for complete search history.

(56) References Cited

U.S. PATENT DOCUMENTS

| 7,580,117 | B2* | 8/2009 | Okada | G01S 7/4812 356/4.01 |
| 7,880,865 | B2* | 2/2011 | Tanaka | G01S 7/4813 356/4.01 |
| 9,621,876 | B2* | 4/2017 | Federspiel | G01S 17/89 |
| 2009/0122294 | A1 | 5/2009 | Okada et al. | |
| 2012/0249996 | A1 | 10/2012 | Tanaka et al. | |

FOREIGN PATENT DOCUMENTS

| JP | 2009-121836 A | 6/2009 |
| JP | 2010-038859 A | 2/2010 |
| JP | 2012-211831 A | 11/2012 |
| JP | 2013-083624 A | 5/2013 |

OTHER PUBLICATIONS

Apr. 22, 2014 Search Report issued in International Patent Application No. PCT/JP2014/057619.

* cited by examiner

*Primary Examiner* — Mark Hellner
(74) *Attorney, Agent, or Firm* — Oliff PLC

(57) ABSTRACT

A laser radar apparatus that includes a rotating mirror is provided. The rotating mirror has a reflective area that reflects outgoing laser light. A flat reflective surface that forms a flat planar shape is formed in a center portion of the reflective area. A sloped reflective surface is formed in a peripheral portion of the center portion of the reflective area, the sloped reflective surface spreading the outgoing laser light incident on the peripheral portion to a periphery of an optical axis of outgoing laser light emitted from the flat reflective surface.

4 Claims, 8 Drawing Sheets

<CONVENTIONAL EXAMPLE>

<CONVENTIONAL EXAMPLE>

⟨CONVENTIONAL EXAMPLE⟩

REFLECTED LIGHT FROM POINT P1

(a)

REFLECTED LIGHT FROM POINT P2

(b)

REFLECTED LIGHT FROM POINT P3

(c)

⟨CONVENTIONAL EXAMPLE⟩

⟨CONVENTIONAL EXAMPLE⟩

⟨REFERENCE EXAMPLE⟩

LASER RADAR APPARATUS

CROSS-REFERENCE TO RELATED APPLICATION

This application is based on and claims the benefit of priority from earlier Japanese Patent Application No. 2013-194171 filed Sep. 19, 2013, the description of which is incorporated herein by reference.

BACKGROUND

Technical Field

The present invention relates to a laser radar apparatus that detects the presence, orientation, distance, and the like of an object using laser light.

Background Art

A laser radar apparatus is used as an apparatus that uses laser light to detect the presence and orientation, as well as distance and the like, of an object in a detection area to be targeted. In general, in the laser radar apparatus, laser light (outgoing light) emitted from a laser light emitting unit is reflected towards the direction of the detection area by a rotating mirror and is scanned in accompaniment with the rotation of the rotating mirror. In addition, laser light (returning light) that has been reflected to an object and returned is reflected towards a detecting unit by the rotating mirror. The detecting unit detects information related by the object by receiving the reflected light. The outgoing light is set to have a divergence angle that is small and to be substantially parallel, so that distant objects can be detected.

In the laser radar apparatus, the presence and orientation of an object is detected based on whether or not an intensity level of reflected light is an object-present level. The distance to the object is measured by an amount of time from emission of the laser light to reception of the reflected light. In addition, in the laser radar apparatus, when the object is far, regardless of the small divergence angle of the laser light, the laser light spreads to a certain extent while traveling to-and-fro over the long distance. Therefore, the intensity of the reflected light reflected by the distant object becomes low. Meanwhile, when the object is near, the laser light is reflected with little spreading. Therefore, in a laser radar apparatus that is configured such that almost all of the reflected light enters a detecting unit (such as a laser radar apparatus that is configured such that an emission optical axis and a reflection optical axis of the laser light differ), the intensity of the reflected light becomes significantly high.

Therefore, the detecting unit outputs an electrical signal of a level that is based on the intensity (light reception intensity) of the reflected light. However, to enable detection of objects having the same reflectance over long distances (several tens of meters) to short distances (several centimeters), uniformly, at substantially the same electrical signal level, the detecting unit performs correction, such as attenuating the electrical signal for short distances (determined by measured time) and raising a threshold for detection of electrical signals. As a result, fog and the like that have low reflectivity are not detected.

Meanwhile, in the laser radar apparatus, a laser radar apparatus of a type in which detection capability is improved by the emission optical axis and the reflection optical axis of the laser light being matched is provided. A basic configuration of this type of laser radar apparatus is shown in FIG. 1. A laser radar apparatus 51 in FIG. 1 includes a laser light emitting unit 52 that emits laser light; a reflection mirror for emission 53, a rotating mirror 54 that is used for both scanning of outgoing light and light reception, a reflection mirror for light reception 55 in which a hole 55a is formed, a detecting unit 56 that detects reflected light reflected by an object, and a light reception lens 57. A reflective surface 54a of the rotating mirror 54 is formed into a flat surface.

The laser light emitted from the laser light emitting unit 52 is emitted in a form similar to parallel light of which the divergence angle is suppressed, so that an object at a far distance can be detected.

In the laser radar apparatus 51, outgoing light 52a emitted from the laser light emitting unit 52 is reflected by the reflection mirror for emission 53. The outgoing light 52a passes through the hole 55a in the reflection mirror for light reception 55 and is reflected by the flat reflective surface 54a of the rotating mirror 54. The outgoing light 52a is emitted towards the direction of a detection area. Reflected light 52b that is reflected by an object and incident on the rotating mirror 54 is reflected towards the direction of the reflection mirror for light reception 55 by the rotating mirror 54. Subsequently, the reflected light 52b is reflected towards the direction of the light reception lens 57 by the reflection mirror for light reception 55, and detected by the detecting unit 56.

In this case, an emission optical axis La on which the outgoing light 52a passes through the reflection mirror for emission 53 and travels towards the rotating mirror 54, and a reflection optical axis Lb on which the reflected light 52b is reflected by the rotating mirror 54 travels towards the reflection mirror for light reception 55 coincide. Structurally, a portion of the reflected light 52b passes through the hole 55a of the light reception reflection mirror 55 towards the direction of the reflection mirror for emission 53.

The laser radar apparatus 51 is required to perform detection over distances from far, at several tens of meters, to near, at several centimeters. Taking into consideration detection of distant objects, in particular, the laser light is emitted in a form in which the divergence angle is small, such that the degree of attenuation of the laser light does not become large.

Here, a relationship between a light reception amount detected by the detecting unit 56 and the distance from the laser radar apparatus 51 to an object is shown in FIG. 2. As the separation distance from the laser radar apparatus 51 to an object, for example, point P1, point P2, point P3, point P4, and point P5 are indicated, from the farthest point in this order. As shown in FIG. 3(a), regarding the reflected light 52b reflected by an object at point P1 that is far from the laser radar apparatus 51, the diameter of the reflected light 52b becomes greater than the reflective surface 54a of the rotating mirror 54 (i.e. it diffuses). Therefore, the intensity itself of the reflected light 52b is weak. Furthermore, because the diameter of the reflected light 52b is large, although a portion of the reflected light can be reflected by the overall area of the reflective surface 54a, the remaining reflected light 52b passes through to the periphery of the reflective surface 54a. Therefore, light reception loss is large. As a result, the light reception amount of the detecting unit 56 is low.

Because point P2 is closer to the laser radar apparatus 51 than point P1, as shown in FIG. 3(b), the intensity itself of the reflected light 52b reflected by the object is slightly strong, and relative light reception loss is small. In this case, the light reception amount at the detecting unit 56 also increases. In addition, at point P3, as shown in FIG. 3(c), the diameter of the reflected light 52b becomes substantially the same as the size of the reflective surface 54a of the rotating mirror 54. The light reception amount becomes maximum.

In the cases of points P1, P2, and P3, above, a portion (near the optical axis) of the reflected light 52b received by the rotating mirror 54 passes through from the hole 55a in the reflection mirror for light reception 55.

Next, because point P4 is even closer to the laser radar apparatus 51, the reflected light 52b reflected by the object has a high light intensity. However, because the diameter of the reflected light 52b is smaller than the reflective surface 54a, as shown in FIG. 4, reflection area of the reflected light 52b that is reflected towards the direction of the detecting unit 56 by the reflection mirror for light reception 55 becomes small. That is, the proportion of the reflected light 52b passing through the hole 55a increases. As a result, the light reception amount at the detecting unit 56 decreases.

Next, because point P5 is even closer to the laser radar apparatus 51, as shown in FIG. 5, the reflected light 52b reflected by the object is such that the diameter of the reflected light 52b becomes even smaller than the reflective surface 52a. As a result, the overall light reception amount at the detecting unit 56 further decreases. In PTL 1, a laser radar apparatus in which an emission optical axis and a reflection optical axis are the same is configured such that an overall area of a reflection area of outgoing light on a rotating mirror is formed by a flat, planar reflective portion.

CITATION LIST

Patent Literature

[PTL 1] JP-A-2009-121836

Technical Problem

As described above, in the laser radar apparatus 51 in which the emission optical axis La and the reflection optical axis Lb are the same, the relative proportion of the reflected light 52b passing through the hole 55a in the reflection mirror for light reception 55 increases as the object becomes closer. An incident-light amount at the detecting unit 56 (the light reception amount in terms of the detecting unit 56) decreases. When an object is at a very near distance, in particular, the incident-light amount at the detecting unit 56 is minimal. Therefore, even when an object to be detected is present at a very near distance, the object may not be detected. In addition, as described above, when the detecting unit 56 performs correction to lower the electrical signal level as the distance becomes shorter, the electrical signal level at for short distances becomes even lower, and this tendency becomes significant.

SUMMARY

Thus it is desired to provide a laser radar apparatus in which an emission optical axis and a reflection optical axis are the same, in which the laser radar apparatus is capable of improving light reception capability at very near distances.

Solution to Problem

A laser radar apparatus of the present disclosure includes: a laser light emitting unit that emits laser light; a reflection mirror for light reception that has a hole that allows outgoing laser light emitted from the laser light emitting unit to pass; a rotating mirror that reflects the outgoing laser light passed through the hole in the reflection mirror for light reception and irradiates the outgoing laser light towards a target area to be targeted, and receives returning laser light reflected from the target area and returned and reflects the returning laser light towards a direction of the reflection mirror for light reception; and a detecting unit that detects the returning laser light reflected by the reflection mirror for light reception. An emission optical axis of the outgoing laser light passed through the hole in the reflection mirror for light reception and reflected by the rotating mirror, and a reflection optical axis of the returning laser light reflected by the rotating mirror coincide. The rotating mirror includes a reflective area—that reflects the outgoing laser light and is configured such that, compared to outgoing laser light when the reflective area is a flat reflective surface, the outgoing laser light emitted from the reflective area is spread to a periphery of an optical axis of the outgoing laser light.

For example, according to a first aspect of the laser radar apparatus, the rotating mirror includes a flat reflective surface that forms a flat planar shape in a center portion of the reflective area that reflects the outgoing laser light, and includes a sloped reflective surface in a peripheral portion of the center portion of the reflective area, the sloped reflective surface spreading the outgoing laser light incident on the peripheral portion to a periphery of an optical axis of the outgoing laser light emitted from the flat reflective surface.

Therefore, according to the first aspect, of outgoing laser light emitted with the initial small divergence angle for long-distance detection, the outgoing laser light reflected by the flat reflective surface is emitted towards the direction of a detection area with the initial small divergence angle. The outgoing laser light has a small divergence angle for long-distance detection. Therefore, the light intensity becomes higher towards the portion near the optical axis and becomes lower towards the end portion far from the optical axis. Of the outgoing laser light, the optical axis portion (the center portion having a high light intensity) is reflected without being diffused by the flat reflective surface and has a strong light intensity. Therefore, the optical axis portion reaches a far distance. Consequently, the optical axis portion is reflected with sufficient light intensity by a target that is at a far distance. In this case, the laser light travels out and back over a long distance. Therefore, regardless of the initial divergence angle being small, the laser light spreads to an extent amounting to the projection area of the reflective surface of the rotating mirror. Consequently, light reception loss of the returning laser light at the rotating mirror is also small. As a result, the detecting unit can detect a distant object with sufficient light reception amount.

Meanwhile, of the outgoing laser light, the outgoing laser light in the end portion (peripheral portion) that has a low light intensity is reflected by the sloped reflective surface, and is spread (diffused) to the periphery of the optical axis of the outgoing laser light emitted from the flat reflective surface. Therefore, when reflected by an object at a near distance, the outgoing laser light is received by substantially the overall surface of the rotating mirror and is reflected towards the direction of the detecting unit by substantially the overall surface of the reflection mirror for light reception. Moreover, while the outgoing laser light reflected by the sloped reflective surface has a low light intensity, when the outgoing laser light reflected by an object at a near distance returns to the detecting unit, the outgoing laser light maintains the light intensity to an extent that light reception can be sufficiently detected by the detecting unit because the distance to and from the object is short.

As described above, regarding an object at a near distance, the above-described diffused outgoing laser light is reflected while maintaining a light intensity that is sufficient for detection. The outgoing laser light is incident on the overall rotating mirror and is received by a wide area of the reflection mirror for light reception. Therefore, even when a portion of the returning laser light passes through the hole in the reflection mirror for light reception, overall, the light reception amount at the detecting unit increases. As a result, light reception capability for near distances can be improved.

In addition, according to a second aspect of the laser radar apparatus, the rotating mirror (20) includes a flat reflective surface (20A1) that forms a flat planar shape in a center portion of the reflective area (E) that reflects the outgoing laser light (6a), and includes a sloped reflective surface (20A2) in a peripheral portion of the center portion of the reflective area (E), the sloped reflective surface (20A2) spreading the outgoing laser light (6a) incident on the peripheral portion to a periphery of an optical axis (La1) of the outgoing laser light (6a) emitted from the flat reflective surface (20A1), after intersecting with the optical axis (La1). According to the second aspect, effects similar to those of the first aspect are achieved.

DESCRIPTION OF EMBODIMENTS

Various embodiments of the present invention will hereinafter be described with reference to the drawings.

First Embodiment

A first embodiment of the present invention will be described with reference to FIG. 6 to FIG. 8.

Figure 1:
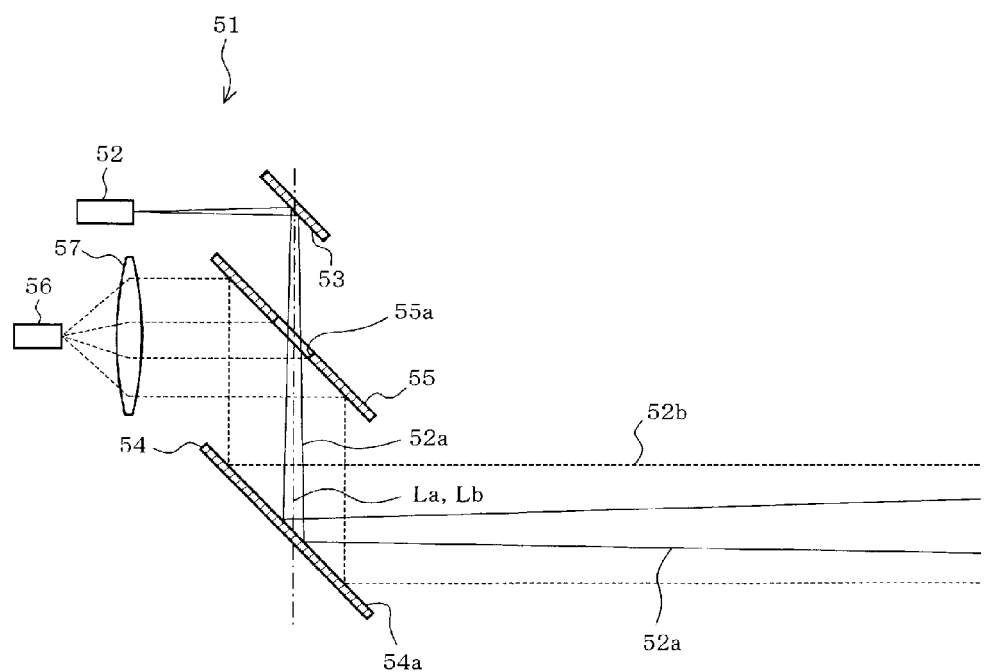
FIG. 1 is a diagram of an optical system of a laser radar apparatus in a conventional example.
Figure 2:
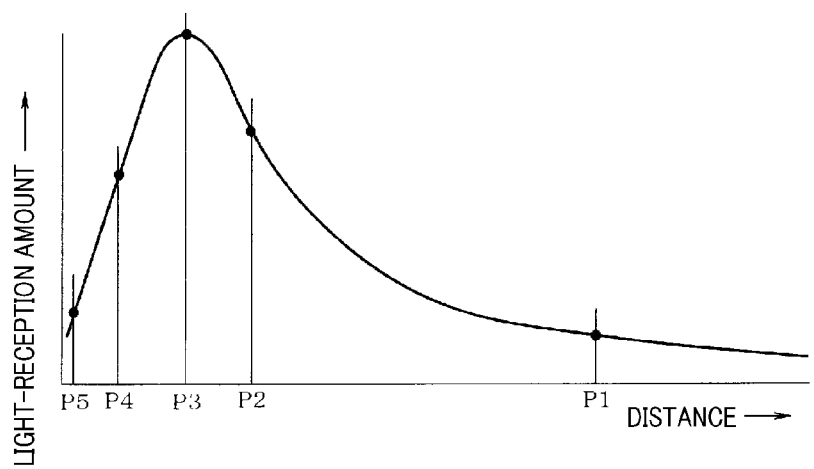
FIG. 2 is a diagram of a relationship between distance from the laser radar apparatus to an object and light reception amount of a detecting unit.
Figure 3:
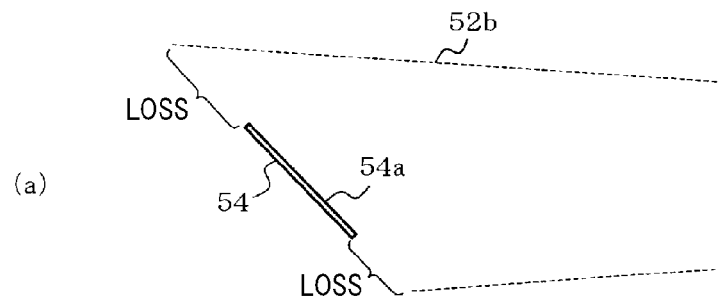
FIG. 3 describes light reception loss caused by rotating mirror placed at various positions in FIG. 2, in which FIG. 3, (a) is a diagram for describing light reception loss at a rotating mirror in the case of point P1 in FIG. 2, (b) is a diagram for describing light reception loss at the rotating mirror in the case of point P2 in FIG. 2, and (c) is a diagram for describing light reception loss at the rotating mirror in the case of point P3 in FIG. 2.
Figure 3:
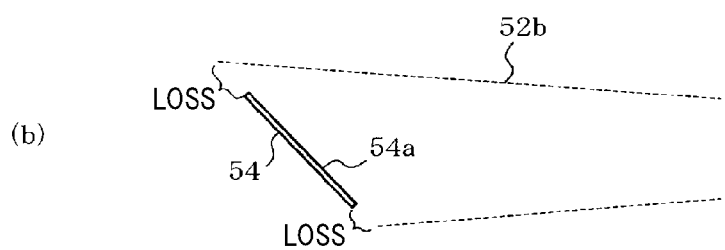
Figure 3:
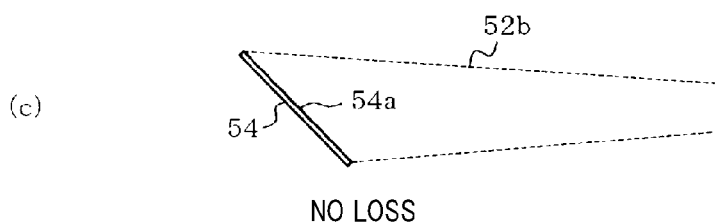
Figure 4:
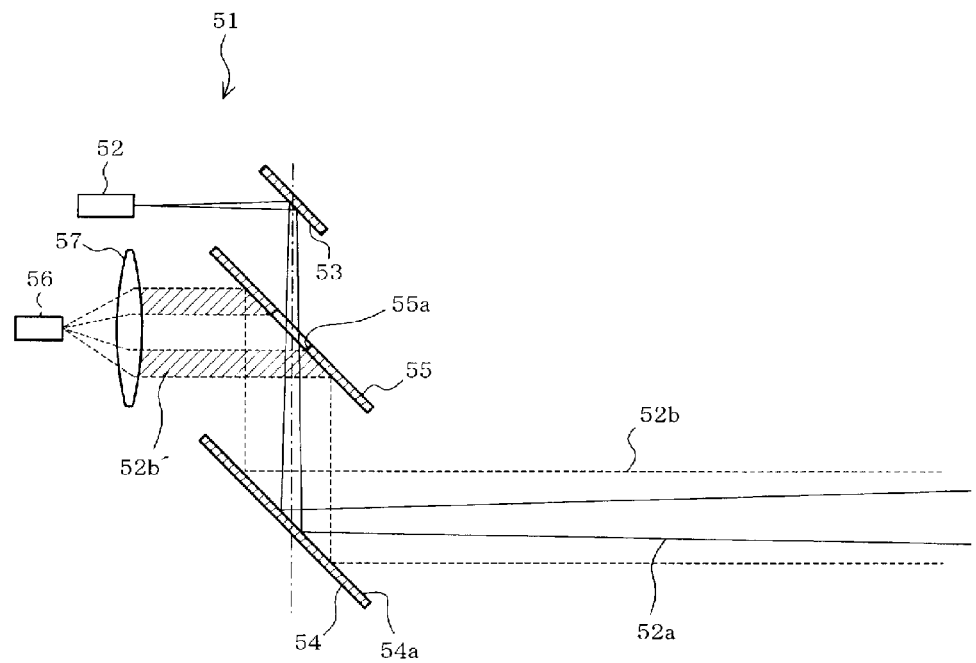
FIG. 4 is a diagram of an aspect of reflected light in the case of point P4 in FIG. 2.
Figure 5:
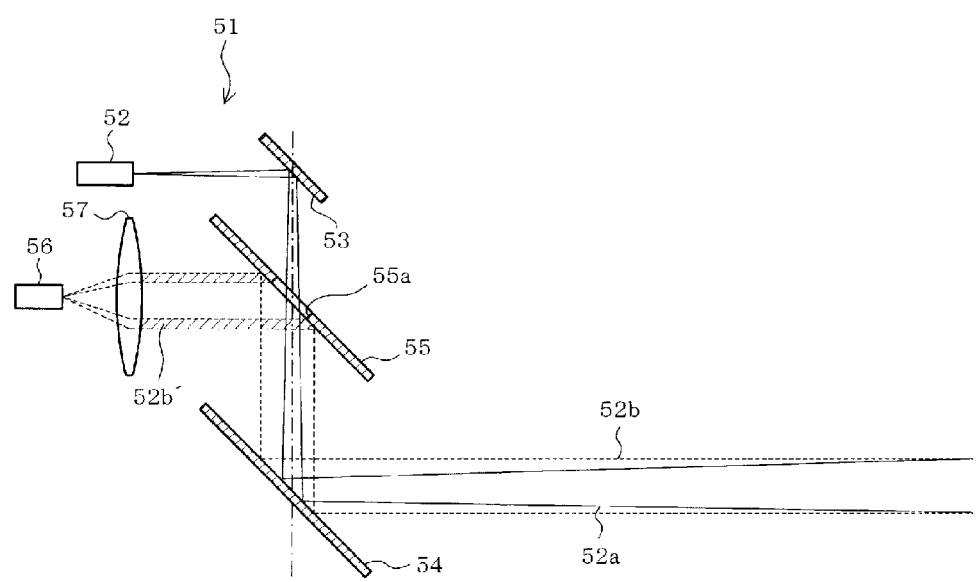
FIG. 5 is a diagram of an aspect of reflected light in the case of point P5 in FIG. 2.
Figure 6:
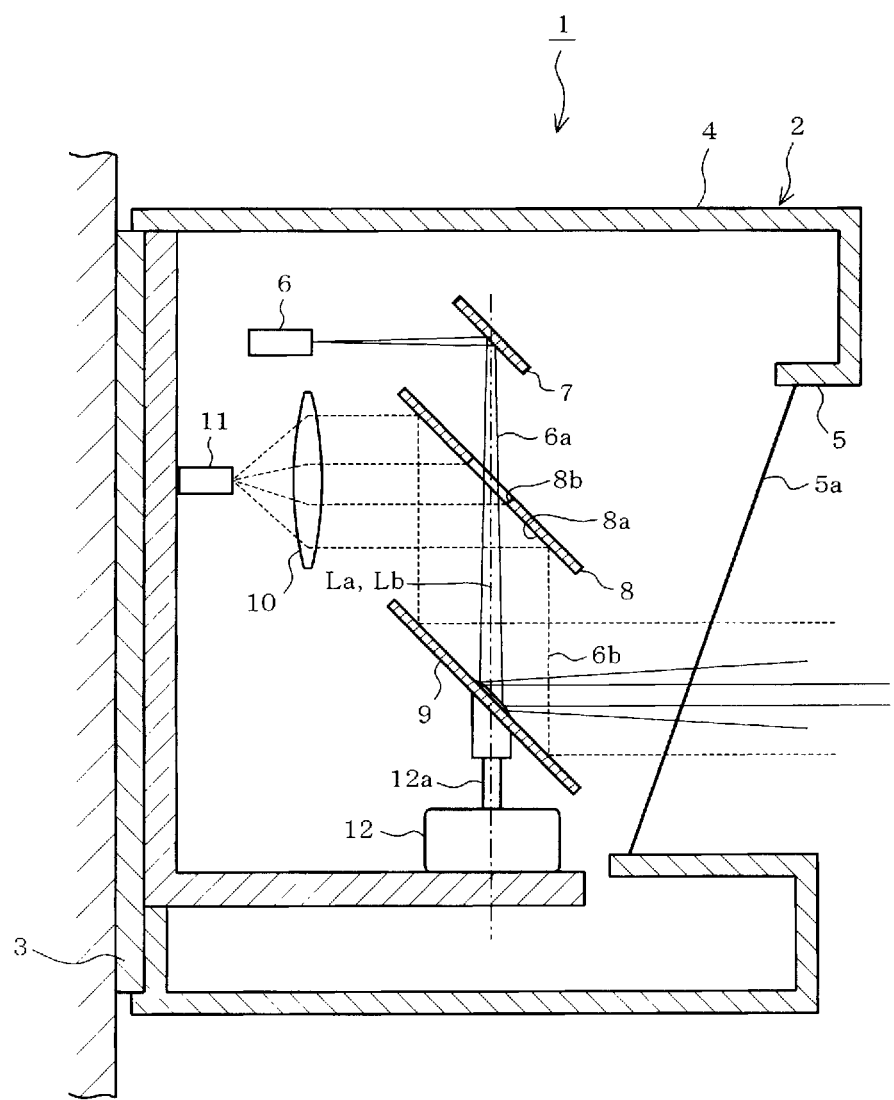
FIG. 6 is a vertical cross-sectional view of an overall configuration of a laser radar apparatus according to a first embodiment of the present invention.

As shown in FIG. 6, a laser radar apparatus 1 according to the first embodiment includes an apparatus main body 2. The apparatus main body 2 has a main body base 3 and an apparatus case 4. A laser-light irradiation opening 5 is formed in the apparatus case 4. The laser light radiation opening 5 is provided with a cover 5a that is integrated with or separate from the apparatus case 4. The cover 5a is capable of transmitting laser light.

Furthermore, a laser light emitting unit 6 that emits laser light, a reflection mirror for emission 7, a reflection mirror for light reception 8, a rotating mirror 9 used for both expansion of outgoing light and light reception, a detecting unit 11 that receives, through a light reception lens 10, laser light reflected by an object, and a motor 12 that rotates the rotating mirror 9 are provided inside the apparatus case 4.

The laser light emitting unit 6 is provided at an orientation so as to emit the laser light in, for example, a horizontal direction in FIG. 6. In addition, the reflection mirror for emission 7 is provided in a section that receives the laser light (corresponding to outgoing laser light and referred to, hereafter, as outgoing light 6a) emitted from the laser light emitting unit 6. The reflection mirror for emission 7 reflects the outgoing light 6a at a predetermined angle and directs the outgoing light 6a downwards. The reflection mirror for light reception 8 is disposed in a position allowing the reflected outgoing light 6a to pass. Furthermore, the rotating mirror 9 is disposed in a position that receives the outgoing light 6a after having passed the reflection mirror for light reception 8.

The reflection mirror for light reception 8 has a reflective surface 8a on one surface and a hole 8b for passing the outgoing light 6a at the center.

The rotating mirror 9 is a mirror at an output stage. The rotating mirror 9 is rotatably provided on the main body base 3 such as to rotate by a rotating shaft 12a of the motor 12 that is has the same axial center as an emission optical axis La of the outgoing light 6a (optical axis of the outgoing light 6a that passes through the hole 8b in the reflection mirror for light reception 8 and travels towards the rotating mirror 9). A reflective surface 9A (surface on the side that reflects the outgoing light 6a and receives reflected light from an object) of the rotating mirror 9 has a form in which a portion excluding a sloped reflective surface 9A2, described hereafter, is tilted at 45°, for example in relation to the rotating shaft 12a. The laser light reflected by an object (corresponding to returning light and, hereafter, reflected light 6b) is reflected by the reflective surface 9A of the rotating mirror 9, is further reflected by the reflective surface 8a of the reflection mirror for light reception 8, passes through the light reception lens 10, and is detected by the detecting unit 11. In this case, the emission optical axis La and the reflection optical axis Lb of the reflected light 6b (optical axis of the reflected light 6b that is reflected by the rotating mirror 9 and travels towards the reflective surface 8a of the reflection mirror for light reception 8) are coaxial. The rotating mirror 9 is rotatably driven by the motor 12.

Figure 7:
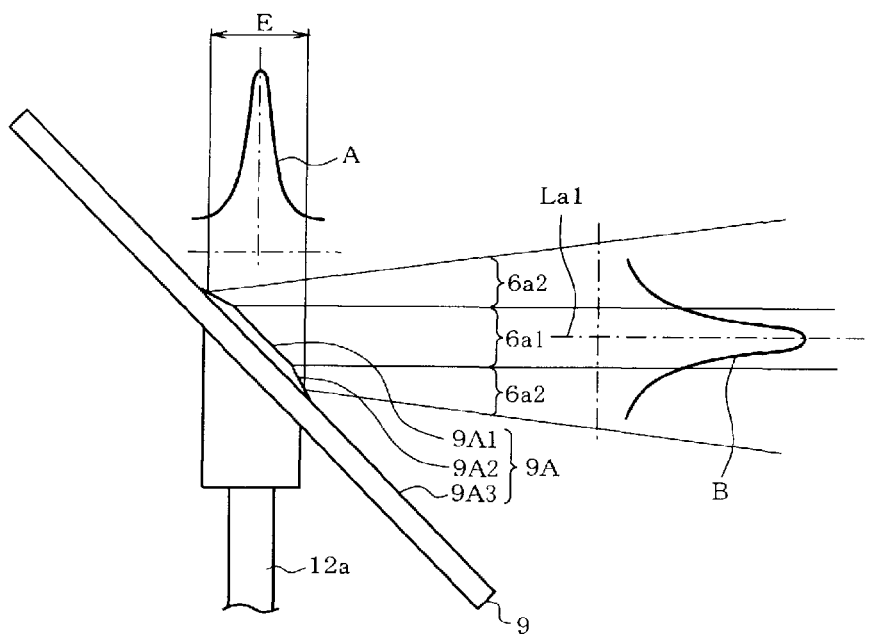
FIG. 7 is a side view of a rotating mirror portion.
Figure 8:
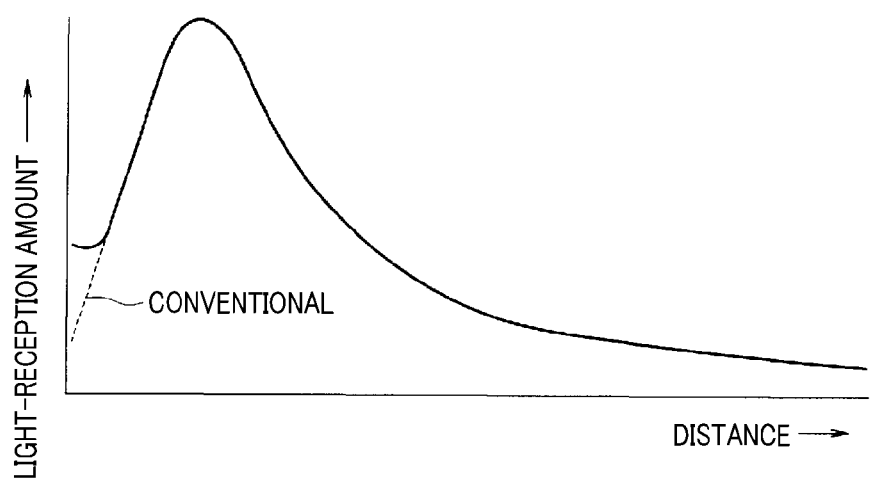
FIG. 8 is a diagram of a relationship between distance from the laser radar apparatus to an object and light reception amount of a detecting unit.

As shown in FIG. 7, on the reflective surface 9A of the rotating mirror 9, a flat reflective surface 9A1 that is formed into a flat planar shape is formed in a center portion of a reflective area E that reflects the outgoing light 6a. A sloped reflective surface 9A2 is formed in a peripheral portion of the center portion. The sloped reflective surface 9A2 configures a sloped form that makes the outgoing light 6a incident on the sloped reflective surface 9A2 spread to the periphery of an optical axis La1 of the outgoing light 6a emitted from the flat reflective surface 9A1. In addition, on the reflective surface 9A of the rotating mirror 9, an area further towards the outer side than the reflective area E functions as a light receiving surface 9A3 for the reflected light 6b. The flat reflective surface 9A1 and the light receiving surface 9A3 are tilted at a predetermined angle, such as 45°, in relation to the rotating shaft 12a. The overall reflective area E forms a protruding shape in relation to the light receiving surface 9A3. However, the center portion that is the apex portion is configured by the flat reflective surface 9A1 that is flat. The peripheral portion is formed by the sloped reflective surface 9A2 that is formed to spread towards the light receiving surface 9A3 from the flat reflective surface 9A1.

The detecting unit 11 includes a photodiode, for example, as a light receiving element. The detecting unit 11 is also configured to include a means for correcting an electrical signal and the like. The detecting unit 11 receives the reflected light 6b and detects (measures) the presence and orientation, as well as the distance and the like, of an object.

In the above-described configuration, the outgoing light 6a emitted from the laser light emitting unit 6 is reflected by the reflection mirror for emission 7. The outgoing light 6a passes through the hole 8b in the reflection mirror for light reception 8. The outgoing light 6a is incident on the flat reflective surface 9A1 and the sloped reflective surface 9A2 of the reflective surface 9A of the rotating mirror 9, and reflected. In this case, as indicated by a characteristic line A in FIG. 7 for convenience, the overall light intensity of the outgoing laser light is such that the light intensity is high towards the portion near the optical axis (center portion) and low towards the end portion away from the optical axis (peripheral portion).

In addition, of the outgoing light 6a, the outgoing light 6a near the optical axis (center portion) is incident on the flat reflective surface 9A1 in the center portion of the reflective area E and reflected. In addition, the outgoing light 6a in the end portion far from the optical axis La is incident on the sloped reflective surface 9A2 in the periphery of the flat reflective surface 9A1 and reflected.

The outgoing light 6a1 near the optical axis La1 that is reflected by the flat reflective surface 9A1 is projected into the detection area while substantially remaining as parallel light. Meanwhile, the outgoing light 6a2 in the end portion that is reflected by the sloped reflective surface 9A2 is spread (diffused) to the periphery of the optical axis La1 of the outgoing light 6a1 reflected by the flat reflective surface 9A1.

Here, the light intensities of the outgoing light beams 6a1 and 6a2 are as indicated by a characteristic line B in FIG. 7. That is, the outgoing light 6a1 near the optical axis La1 has a strong light intensity and the outgoing light 6a2 in the end portion has a weak light intensity and is diffused.

The outgoing light 6a1 reflected by the flat reflective surface 9A1 is emitted towards the direction of the detection area with the initial small divergence angle. The outgoing light 6a1 has a small divergence angle for long-distance detection. Therefore, the light intensity becomes higher towards the portion near the optical axis La1 and becomes lower towards the end portion far from the optical axis La1. Of the outgoing light 6a1, the optical axis La1 portion (the center portion having a high light intensity) is reflected without being diffused by the flat reflective surface 9A1 and has a strong light intensity. Therefore, the optical axis La1 portion reaches a far distance. Consequently, the optical axis La1 portion is reflected with sufficient light intensity by a target that is at a far distance. In this case, the laser light travels to and fro over a long distance. Therefore, regardless of the initial divergence angle being small, the laser light spreads to an extent amounting to the projection area of the reflective surface 9A of the rotating mirror 9. Consequently, light reception loss of the reflected light 6b at the rotating mirror 9 is also small. As a result, the detecting unit 11 can detect a distant object with sufficient light reception amount.

Meanwhile, of the outgoing light 6a, the outgoing light 6a in the end portion (peripheral portion) that has a low light intensity is reflected by the sloped reflective surface 9A2, and is spread (diffused) to the periphery of the optical axis La1 of the outgoing light 6a1 emitted from the flat reflective surface 9A1. Therefore, when reflected by an object at a near distance, the outgoing light 6a is received by substantially the overall surface of the rotating mirror 9 and is reflected towards the direction of the detecting unit 11 by substantially the overall surface of the reflection mirror for light reception 8. Moreover, while the outgoing light 6a2 reflected by the sloped reflective surface 9A2 has a low light intensity, when the outgoing light 6a2 reflected by an object at a near distance returns to the detecting unit 11, the outgoing light 6a2 maintains the light intensity to an extent that light reception can be sufficiently detected by the detecting unit 11 because the distance to and from the object is short.

As described above, regarding an object at a near distance, the above-described diffused outgoing light 6a2 is reflected while maintaining a light intensity that is sufficient for detection. The outgoing light 6a2 is incident on the overall rotating mirror 9 and is received by a wide area of the reflection mirror for light reception 8. Therefore, even when a portion of the reflected light 6b passes through the hole 8b in the reflection mirror for light reception 8, overall, the light reception amount at the detecting unit 11 increases. As a result, as indicated by the solid line in FIG. 8, light reception capability for near distances can be improved. Consequently, regarding objects at far distances to near distances in relation to the laser radar apparatus 1, the presence, orientation, distance, and the like thereof can be sufficiently detected.

In addition, even when a detecting unit configured to perform correction, such as attenuating an electrical signal or raising a threshold, in response to light reception at a near distance is used as the detecting unit 11, distance measurement for short distances is sufficiently possible. In addition, because the reflected light 6b that has a strong light intensity mostly passes through the hole 8b in the reflection mirror for light reception 8, a detecting unit of a type that does not perform the above-described correction can also be used as the detecting unit 11.

The sloped reflective surface 9A2 is sloped in a form that configures a linear cross-sectional shape. However, the sloped reflective surface 9A2 may be sloped in a form that configures a convex cross-sectional shape.

Figure 9:
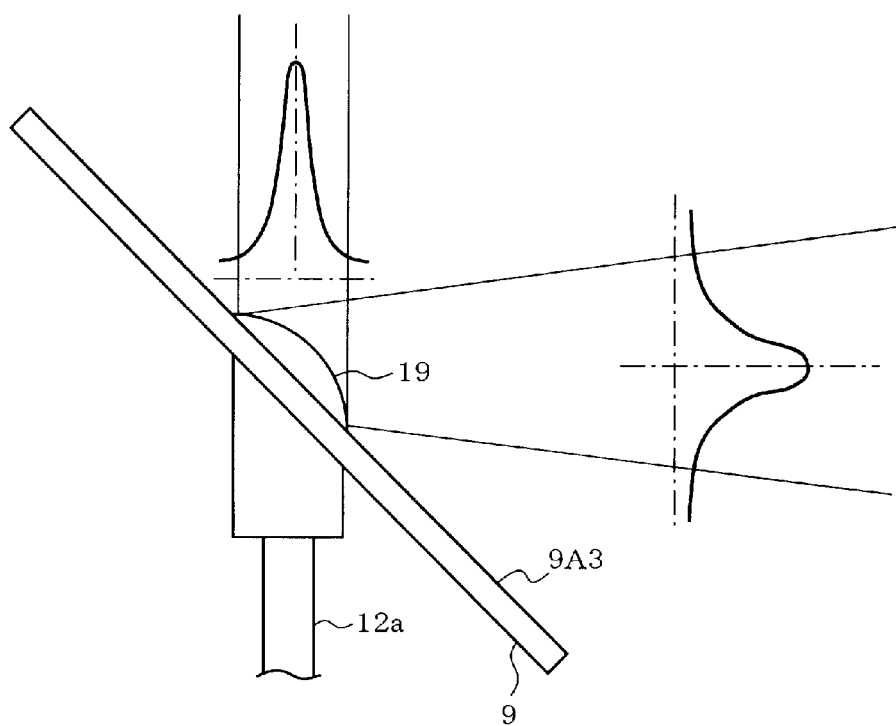
FIG. 9 is a side view of a rotating mirror portion, showing a reference example.

Here, it may seem acceptable for a reflective surface 19 that has an overall convex shape to be formed, as shown in FIG. 9, instead of the flat reflective surface 9A1 and the sloped reflective surface 9A2. However, because the overall outgoing light 6a is diffused, the light intensity near the optical axis also weakens, and detection capability for long distances becomes poor.

In this regard, according to the present embodiment, reflection can be performed with the light intensity near the optical axis remaining strong.

Second Embodiment

Figure 10:
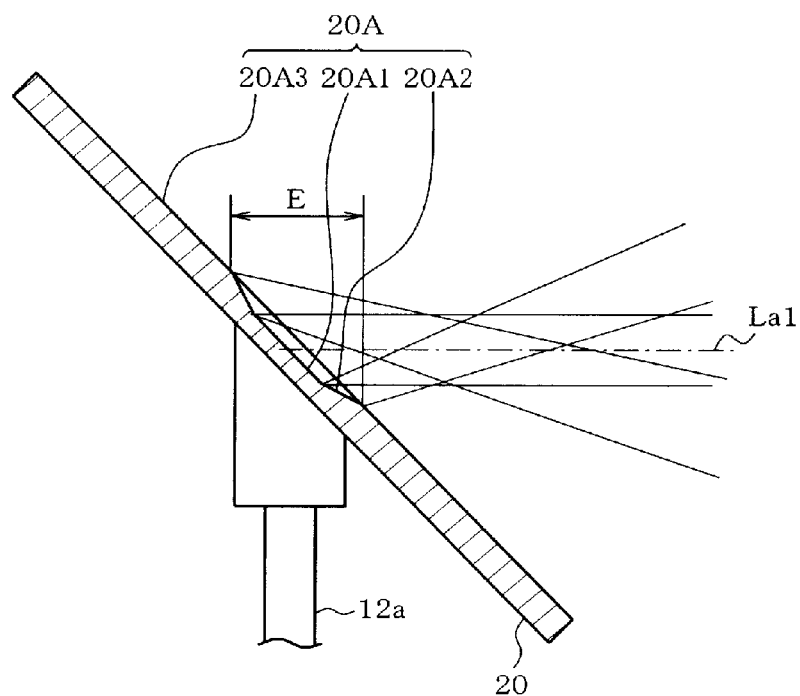
FIG. 10 is a cross-sectional view of a rotating mirror portion according to a second embodiment of the present invention.

FIG. 10 shows a second embodiment. A rotating mirror 20 differs from the rotating mirror 9 according to the first embodiment. Other configurations are similar to those according to the first embodiment.

In the rotating mirror 20, a flat reflective surface 20A1 that is formed into a flat planar shape is formed in a center portion of a reflective area E that reflects the outgoing light 6a. A sloped reflective surface 20A2 is formed in a peripheral portion of the center portion. The sloped reflective surface 20A2 configures a sloped form that makes the outgoing light 6a incident on the sloped reflective surface 20A2 spread to the periphery of an optical axis La1 of the outgoing light 6a emitted from the flat reflective surface 20A1, after intersecting with the optical axis La1. In addition, on a reflective surface 20A of the rotating mirror 20, an area further towards the outer side than the reflective area E functions as a light receiving surface 20A3 for the reflected light 6b. The flat reflective surface 20A1 and the light receiving surface 20A3 are tilted at a predetermined angle (45°) in relation to the rotating shaft 12a. The overall reflective area E forms a recessing shape in relation to the light receiving surface 20A3. However, the center portion that is the bottom portion is configured by the flat reflective surface 20A1 that is flat. The peripheral portion is formed by the sloped reflective surface 9A2 that is formed to spread towards the light receiving surface 20A3 from the flat reflective surface 20A1.

According to the second embodiment as well, effects similar to those according to the first embodiment are achieved.

The sloped reflective surface 20A2 is sloped in a form that configures a linear cross-sectional shape. However, the sloped reflective surface 20A2 may be sloped in a form that configures a concave cross-sectional shape. A configuration is also possible in which the sloped reflective surface 20A2 is formed in the periphery of the flat reflective surface 20A1, and a sloped reflective surface having the same slope as the sloped reflective surface 20A2 is further formed in the periphery thereof. Light receiving surfaces 9A3 and 20A3 may be flat surfaces or concave surfaces.

Figure 11:
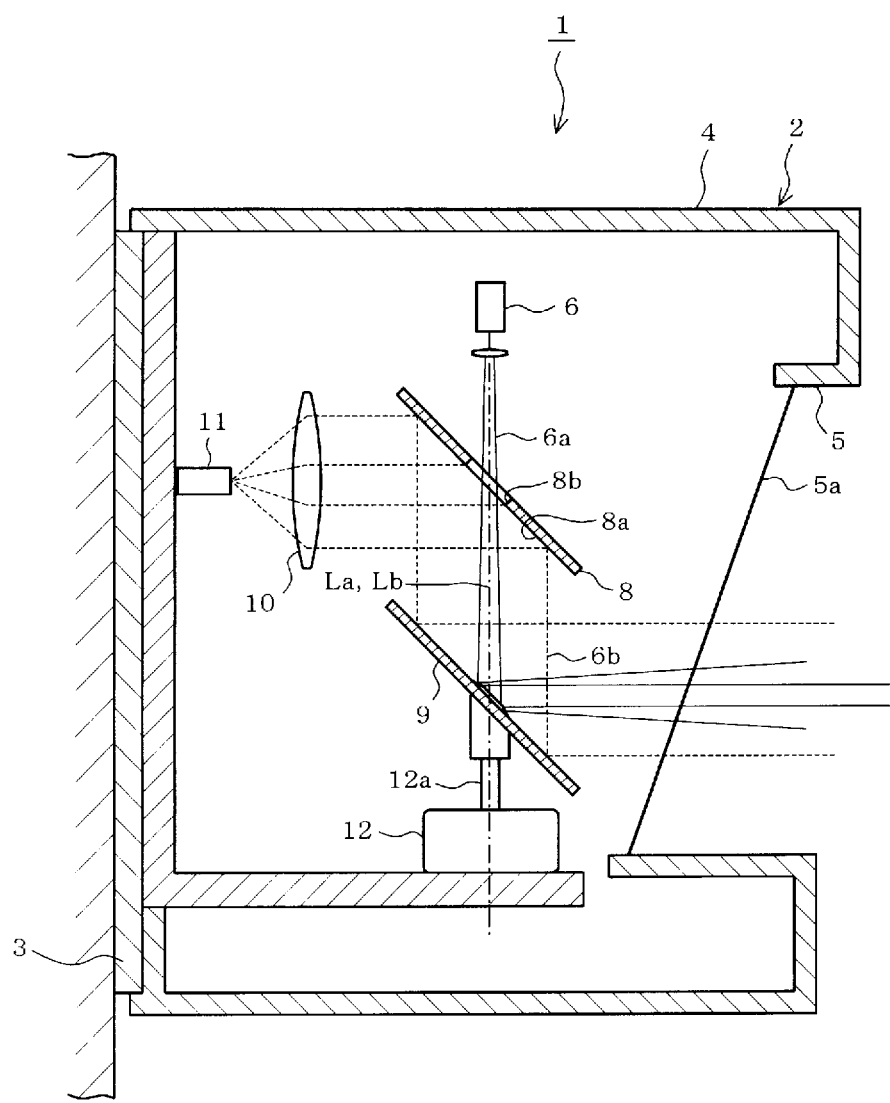
FIG. 11 is a vertical cross-sectional view of an overall configuration of a laser radar apparatus according to a third embodiment of the present invention.

In addition, as shown in FIG. 11, the laser light emitting unit 6 may be provided in a position such that the outgoing light 6a is directly incident on the rotating mirror 9 through the hole 8b of the reflection mirror for light reception 8.

Several embodiments of the present invention are described. However, these embodiments are presented as examples and are not intended to limit the scope of the invention. These new embodiments can be carried out in various other modes. Various omissions, substitutions, and modifications can be made without departing from the spirit of the invention. These embodiments and modifications thereof are included in the scope and spirit of the invention, and are included in the invention recited in the scope of claims and scopes equivalent thereto.

REFERENCE SIGNS LIST

In the drawings, 1 denotes a laser radar apparatus; 6 denotes a laser light emitting unit; 7 denotes a reflection mirror for emission; 8 denotes a reflection mirror for light reception; 8b denotes a hole; 9 denotes a rotating mirror; 9A1 denotes a flat reflective surface; 9A2 denotes a sloped reflective surface; 9A3 denotes a light receiving surface; 11 denotes a detecting unit; 20 denotes a rotating mirror; 20A1 denotes a flat reflective surface; 20A2 denotes a sloped reflective surface; 20A3 denotes a light receiving surface; La and La1 denote an emission optical axis; and Lb denotes a reflection optical axis.

What is claimed is:

1. A laser radar apparatus comprising:
a laser light emitting unit that emits laser light;
a reflection mirror for light reception that has a hole that allows outgoing laser light emitted from the laser light emitting unit to pass;
a rotating mirror that reflects the outgoing laser light passed through the hole in the reflection mirror for light reception and irradiates the outgoing laser light towards a target area to be targeted, and receives returning laser light reflected from the target area and returned and reflects the returning laser light towards a direction of the reflection mirror for light reception; and
a detecting unit that detects the returning laser light reflected by the reflection mirror for light reception, wherein
an emission optical axis of the outgoing laser light passed through the hole in the reflection mirror for light reception and reflected by the rotating mirror, and a reflection optical axis of the returning laser light reflected by the rotating mirror coincide, and
the rotating mirror includes a reflective area that reflects the outgoing laser light and is configured such that, compared to outgoing laser light when the reflective area is a flat reflective surface, the outgoing laser light emitted from the reflective area is spread to a periphery of an optical axis of the outgoing laser light,
wherein the rotating mirror includes a flat reflective surface that forms a flat planar shape in a center portion of the reflective area that reflects the outgoing laser light, and includes a sloped reflective surface in a peripheral portion of the center portion of the reflective area, the sloped reflective surface spreading the outgoing laser light incident on the peripheral portion to a periphery of an optical axis of the outgoing laser light emitted from the flat reflective surface.

2. The laser radar apparatus according to claim 1, wherein:
the flat reflective surface is formed to protrude further outward than a surface of the rotating mirror, and the sloped reflective surface is formed as a sloped surface connecting the surface and the flat reflective surface.

3. The laser radar apparatus according to claim 1, wherein:
the rotating mirror includes a flat reflective surface that forms a flat planar shape in a center portion of the reflective area that reflects the outgoing laser light, and includes a sloped reflective surface in a peripheral portion of the center portion of the reflective area, the sloped reflective surface spreading the outgoing laser light incident on the peripheral portion to a periphery of an optical axis of the outgoing laser light emitted from the flat reflective surface, after intersecting with the optical axis.

4. The laser radar apparatus according to claim 3, wherein the flat reflective surface is formed to recess further inward than a surface of the rotating mirror, and the sloped reflective surface is formed as a sloped surface connecting the surface and the flat reflective surface.

* * * * *